Figure 1:
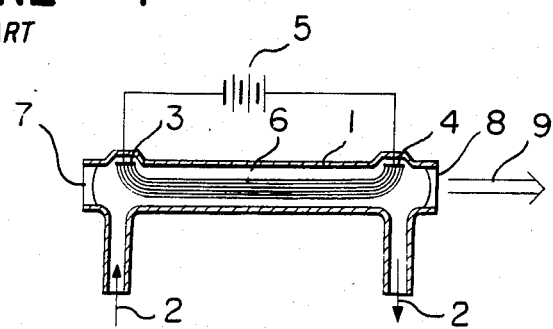

United States Patent [19]

Kimbara

[11] Patent Number: 4,597,086
[45] Date of Patent: Jun. 24, 1986

[54] COAXIAL TYPE LASER OSCILLATOR FOR EXCITATION BY SILENT DISCHARGE

[75] Inventor: Yoshihide Kimbara, Nagoya, Japan

[73] Assignee: Mitsubishi Denki Kabushiki Kaisha, Tokyo, Japan

[21] Appl. No.: 631,173

[22] Filed: Jul. 16, 1984

[30] Foreign Application Priority Data

Aug. 9, 1983 [JP] Japan .................. 58-145174

[51] Int. Cl.$^4$ ............................................. H01S 3/03
[52] U.S. Cl. ........................................ 372/61; 372/85; 372/82
[58] Field of Search ................ 372/81, 87, 85, 58, 372/82, 61

[56] References Cited

U.S. PATENT DOCUMENTS

| | | |
|---|---|---|
| 3,460,053 | 8/1969 | Leonard . |
| 4,061,986 | 12/1977 | Barker . |
| 4,375,690 | 3/1983 | Tabata et al. ................ 372/82 |
| 4,455,658 | 6/1984 | Sutter, Jr. ..................... 372/82 |
| 4,509,176 | 4/1985 | Marchetti et al. ............ 372/87 |

FOREIGN PATENT DOCUMENTS

| | | |
|---|---|---|
| 0067797 | 12/1982 | European Pat. Off. . |
| 1085013 | 9/1967 | United Kingdom . |
| 1196785 | 7/1970 | United Kingdom . |
| 1201444 | 8/1970 | United Kingdom . |

OTHER PUBLICATIONS

Crocker et al.; "Carbon-Dioxide Laser with High Power per Unit Length", Electronics Letters, v. 5, No. 4, Feb. 20, 1969, p. 63.
Bolchan; "On a Poss. of Using Noncontracted Discharge to Enhance the Power of a $CO_2-N_2$-He Laser", Opt. and Spectros., vol. 25, #3, Sep. 1968.
"Functional Ion Laser Based Upon a Thermionic Hollow Cathode Discharge" by D. A. Huchital & J. D. Rigden; The Review of Scientific Instruments, vol. 39, No. 10, Oct. 1968; pp. 1472-1477.
"Laser Lichtverstarker Und-Oszillatoren", by Dr. Dieter Ross; Akademische Verlagsgesellschaft, Frankfurt, Germany 1966, pp. 216-220.
"Hollow Cathode Discharges for Gas Lasers" by K. Rozsa, pp. 649-664.
"Ultraminiature High-Power Gas Discharge Lasers Excited Through High Dielectric Constant Ceramic Materials", Review of Scientific Instruments, 51(3), Mar. 1980, pp. 384-385.
"Simultaneous HF and DF Laser Excited by a Ferroelectric Ceramic Capacitively Coupled Discharge", J. E. Brandelik, J. Applied Physics 51(3), Mar. 1980, pp. 1321-1323.
"Laser Handbook", vol. 1, edited by F. T. Arecchi, 1972; pp. 623-626.

*Primary Examiner*—Léon Scott, Jr.
*Attorney, Agent, or Firm*—Oblon, Fisher, Spivak, McClelland & Maier

[57] ABSTRACT

A coaxial type laser oscillator to carry out excitation of laser medium gas by voiceless discharge with high performance.

The laser oscillator is constructed in such a manner that at least a pair of ring-shaped electrodes are disposed on and around the outer peripheral surface of the discharge tube, and alternating current voltage is applied across the electrodes so as to enable the voiceless discharge to be generated in the discharge tube and to output laser beam outside the oscillator.

7 Claims, 3 Drawing Figures

COAXIAL TYPE LASER OSCILLATOR FOR EXCITATION BY SILENT DISCHARGE

This invention relates to a coaxial type laser oscillator to carry out excitation of laser medium gas by silent discharge.

As this kind of the coaxial type laser oscillator, there has so far been known one as shown in FIG. 1 of the accompanying drawing. FIG. 1 is a longitudinal cross-sectional view showing a schematic construction of the conventional coaxial type laser oscillator. As shown in the drawing, laser medium gas 2 is caused to flow in and through a discharge tube, and a d.c. power source 5 is connected between a cathode 3 and an anode 4 provided in the discharge tube 1 to generate glow discharge 6 between the cathode 3 and the anode 4. At both ends of the discharge tube 1, a total reflection mirror 7 and a partial reflection mirror 8 are disposed in opposition each other so as to generate the laser oscillation and to emit a laser beam output 9 outside the oscillator thereby.

Since the conventional coaxial type laser oscillator is constructed as mentioned above, it has various disadvantages such that a discharge distance between the cathode 3 and the anode 4 is relatively long, hence the stable glow discharge 6 is difficult to be obtained unless a pressure of the laser medium gas 2 is made as low as approximately 20 Torr or so; further, when discharge current of the glow discharge 6 is gradually decreased, the glow discharge 6 is extinguished at last to become unable to vary the discharge current for the glow discharge 6 in a wide range, owing to which, when the output intensity of the laser beam 9 is low, the output can hardly be taken out; and, since the cathode 3 and the anode 4, etc. are made of metal material, these component parts are consumed by the glow discharge 6; and others.

The present invention has been made with a view to improving various disadvantages inherent in the conventional coaxial type laser oscillator, and aims at providing a high performance coaxial type laser oscillator to carry out excitation of the laser medium gas by silent discharge, wherein the oscillator is constructed in such a manner that at least a pair of ring-shaped electrodes are disposed on and around the outer circumference of the discharge tube, and a.c. voltage is applied across the electrodes, thereby making it possible to generate the silent discharge in the discharge tube and to output laser beam.

Figure 2:
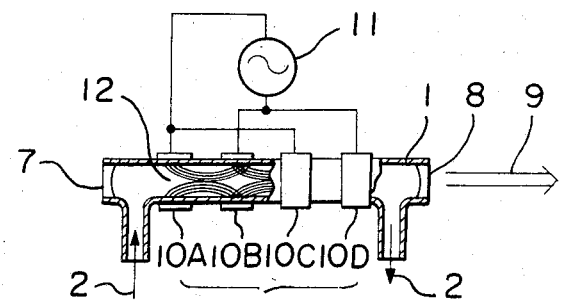
Figure 3:
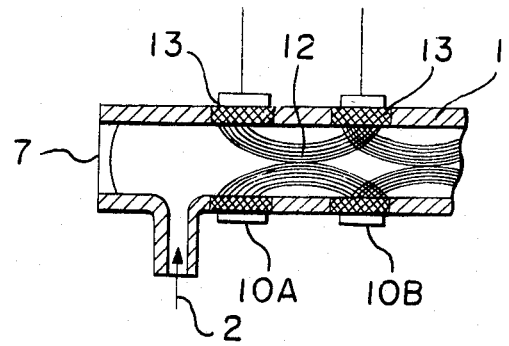

Preferred embodiments of the present invention will be described in detail hereinbelow with reference to the accompanying drawings which illustrate a couple of specific and preferred embodiments, in which:

FIG. 1 is a longitudinal cross-sectional view showing a schematic construction of the conventional coaxial type laser oscillator;

FIG. 2 is also a longitudinal cross-sectional view showing a schematic construction of a coaxial type laser oscillator to carry out excitation by silent discharge according to one embodiment of the present invention; and FIG. 3 is a partially enlarged longitudinal cross-sectional view showing a schematic construction of the coaxial type laser oscillator to carry out excitation by silent discharge according to another embodiment of the present invention.

In the following, the present invention will be explained in reference to the accompanying drawing illustrating a couple of preferred embodiment thereof.

FIG. 2 is a longitudinal cross-sectional view showing a schematic construction of the coaxial type laser oscillator to cary out excitation by silent discharge according to one embodiment of the present invention. As shown in the drawing, laser medium gas 2 is caused to flow in the discharge tube 1 made of an insulating material (dielectric substance) such as a glass tube, and so forth. On and around the outer peripheral surface of the discharge tube 1, there are disposed two pairs of ring-shaped electrodes 10A, 10B, 10C, and 10D, and an a.c. power source 11 is connected to these electrodes pairs 10A, 10B, 10C, and 10D, after which alternating current voltage is applied across the mutually adjacent electrodes 10A, 10B and 10C, 10D. It should be preferred that the frequency of this alternating current voltage is set at about 10 KHz, or, more particularly, in a range of from about 100 KHz to 500 KHz. Upon application of the a.c. voltage, the silent discharge 12 is generated in the discharge tube 1. In this case, the dielectric substance such as the glass tube, etc. constituting the discharge tube 1 has an effect of taking a balance between the silent discharges 12, owing to which uniform current flows between the adjacent electrodes 10A through 10D. The laser medium gas 2 is excited by the silent discharge 12, and the laser oscillation is generated between the total reflection mirror 7 and the partial reflection mirror 8 to produce an output laser beam 9 outside the laser oscillator.

FIG. 3 is a partially enlarged longitudinal cross-sectional view showing a schematic construction of the coaxial type laser oscillator to carry out excitation by silent discharge according to another embodiment of the present invention. In the embodiment shown in FIG. 3, the portion and the neighboring area of the discharge tube 1 where the ring-shaped electrodes 10A through 10D are provided is constructed with a dielectric substance 13 such as, for example, a barium titanate type ceramic so as to enable electric current for the silent discharge 12 to be increased, and to obtain a large laser beam output 9. The other construction of the laser oscillator in this embodiment is same as that of the first embodiment of the laser oscillator shown in FIG. 2.

As shown in each of the above-described embodiments, the coaxial type laser oscillator to carry out excitation by silent discharge according to the present invention has a good balance in the silent discharge 12 and the discharge current can be varied in a wide range, so that it is able to arbitrarily vary the laser beam output 9 in comparison with this kind of the conventional coaxial type laser oscillator. Further, since the above-mentioned silent discharge 12 is generated within the discharge tube 1, there is no possibility of the electrodes 10A through 10D provided on the outer peripheral surface of the discharge tube 1 being consumed.

By the way, in the above-described embodiments, explanations have been given for the instances, wherein two pairs of electrodes 10A through 10D are used, although any number of pairs may be provided to exhibit the same resulting effect as is the case with the aforedescribed embodiments.

As has been explained in the foregoing, since the present invention constructs the coaxial type laser oscillator in such a manner that at least a pair of ring-shaped electrodes to apply alternating current voltage to the discharge tube are disposed on and around the outer peripheral surface of the discharge tube, and the laser medium gas is excited by the silent discharge to be generated in the above-mentioned discharge tube, there may accrue various excellent effects, in comparison with those obtained by this kind of the conventional coaxial type laser oscillator, such that the electric discharge can be done stably, the output of the laser beam can be varied in a wide range, consumption of the electrodes can be lowered remarkably, and so the coaxial type laser oscillator to carry out excitation by silent discharge with high performance can be obtained.

I claim:

1. A coaxial silent discharge type laser device comprising:
   (a) a discharge tube made of an insulating material;
   (b) a laser medium gas flowing from one end to the other end of said discharge tube;
   (c) a laser oscillator constructed with a partial reflection mirror and a total reflection mirror, said reflection mirrors being disposed at both ends of said discharge tube in a mutually opposed relationship;
   (d) at least a pair of ring-shaped electrodes disposed on and around the outer peripheral surface of said discharge tube with a predetermined space interval being provided between them, said discharge tube at a position underneath said electrodes being made of a dielectric material of a high dielectric constant different from said insulating material which allows the electric current for said silent discharge to be increased thereby producing a larger laser output; and
   (e) an a.c. power source to supply alternating current voltage to said pair of electrodes.

2. The coaxial type laser device according to claim 1, wherein said discharge tube is made of glass tube.

3. The coaxial type laser device according to claim 1, wherein said dielectric material of high dielectric constant is barium titanate type ceramic.

4. The coaxial type laser device according to claim 1, wherein said dielectric material of high dielectric constant is titanium oxide.

5. The coaxial type laser device according to claim 1, wherein said ring-shaped electrodes to be disposed are in plural pairs.

6. The coaxial type laser device according to claim 5, wherein said plurality of pairs are two pairs.

7. The coaxial type laser device according to claim 1, wherein said discharge tube is in a cylindrical form.

* * * * *